US010586083B2

(12) United States Patent
Ownby et al.

(10) Patent No.: US 10,586,083 B2
(45) Date of Patent: Mar. 10, 2020

(54) ACTIVE RFID TAG ARRANGEMENTS FOR ACTUATION OF DOWNHOLE EQUIPMENT IN WELL FLUIDS

(71) Applicant: Weatherford Technology Holdings, LLC, Houston, TX (US)

(72) Inventors: John Ownby, Houston, TX (US); Matthew Knight, Houston, TX (US); Richard Dalzell, Houston, TX (US); Rupa Sharma, Houston, TX (US); Eric R. Evans, Houston, TX (US); Jobby T. Jacob, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/747,421

(22) PCT Filed: Jul. 27, 2016

(86) PCT No.: PCT/US2016/044235
§ 371 (c)(1),
(2) Date: Feb. 16, 2017

(87) PCT Pub. No.: WO2017/027218
PCT Pub. Date: Feb. 16, 2017

(65) Prior Publication Data
US 2018/0225485 A1    Aug. 9, 2018

Related U.S. Application Data

(60) Provisional application No. 62/202,267, filed on Aug. 7, 2015.

(51) Int. Cl.
*G06K 7/10*    (2006.01)
*E21B 47/12*    (2012.01)
(Continued)

(52) U.S. Cl.
CPC ......... *G06K 7/10158* (2013.01); *E21B 23/04* (2013.01); *E21B 47/122* (2013.01);
(Continued)

(58) Field of Classification Search
CPC ........... G06K 7/10158; G06K 19/0702; G06K 19/0708; G06K 19/07749; E21B 23/00; E21B 23/04; E21B 47/122; G01V 15/00
See application file for complete search history.

(56) References Cited

U.S. PATENT DOCUMENTS

2010/0245075 A1* 9/2010 Stevens ................. G06Q 10/08
340/539.1
2010/0326665 A1* 12/2010 Redlinger ............ E21B 29/005
166/339
(Continued)

FOREIGN PATENT DOCUMENTS

WO    2011-021053 A2    2/2011

OTHER PUBLICATIONS

Int'l Search Report and Written Opinion in counterpart PCT Appl. PCT/US2016/044235, dated Nov. 2, 2016.
(Continued)

*Primary Examiner* — Thomas D Alunkal
(74) *Attorney, Agent, or Firm* — Blank Rome LLP

(57) ABSTRACT

A first RFID tag arrangement for actuating a downhole tool includes a non-metallic housing enclosing a passive RFID tag, power source, pulsed oscillator circuit, and energizer coil. The pulsed oscillator circuit drives the energizer coil to stimulate and activate the tag such that it can be read by an external reader. A second RFID tag arrangement includes a non-metallic housing enclosing a power source, a transmission circuit, and a transmitter coil. The transmission circuit can drive the transmitter coil to transmit a payload stored in the transmission circuit such that the payload is delivered to
(Continued)

an external reader. A method of actuating a downhole tool includes placing the tool's RFID tag reader in listen only mode, introducing into the wellbore an active RFID tag that transmits its payload to the reader, and optionally configuring the reader to reprogram the tag when it receives the payload therefrom.

18 Claims, 4 Drawing Sheets

(51) Int. Cl.
*G06K 19/07* (2006.01)
*G01V 15/00* (2006.01)
*G06K 19/077* (2006.01)
*E21B 23/04* (2006.01)

(52) U.S. Cl.
CPC ......... *G01V 15/00* (2013.01); *G06K 19/0702* (2013.01); *G06K 19/0708* (2013.01); *G06K 19/07749* (2013.01)

(56) References Cited

U.S. PATENT DOCUMENTS

| | | | |
|---|---|---|---|
| 2013/0193916 A1* | 8/2013 | Koyama | G06F 1/263 320/108 |
| 2014/0292495 A1* | 10/2014 | Christiansen | E21B 17/006 340/10.34 |
| 2015/0090494 A1 | 4/2015 | Lazarev et al. | |
| 2015/0285034 A1* | 10/2015 | Frisby | E21B 34/14 166/373 |
| 2016/0040496 A1* | 2/2016 | Mahajan | E21B 10/42 166/376 |
| 2017/0254195 A1* | 9/2017 | Knight | E21B 47/12 |

OTHER PUBLICATIONS

First Office Action in counterpart Canadian Appl. 2993936, dated Nov. 26, 2018, 5-pgs.
Second Office Action in counterpart Canadian Appl. 2993936, dated Sep. 30, 2019, 5-pgs.

* cited by examiner

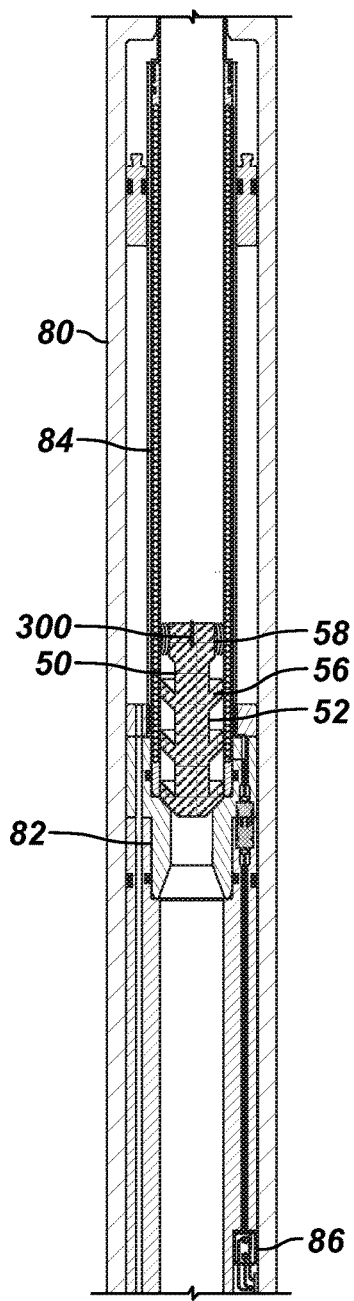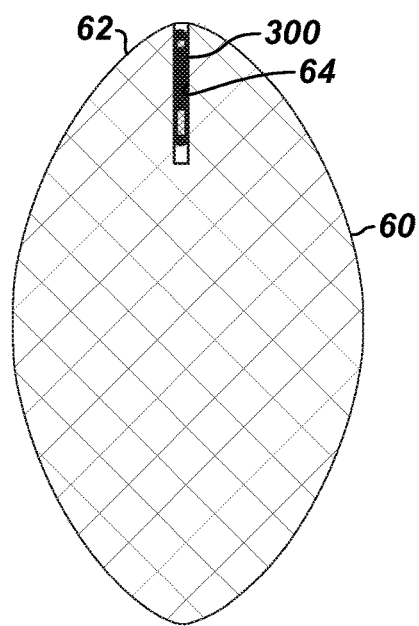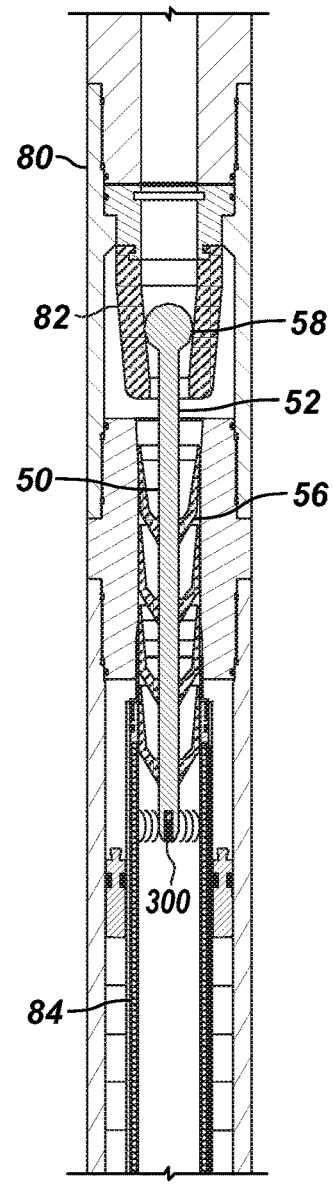
FIG. 4D
FIG. 4E
FIG. 4F

ACTIVE RFID TAG ARRANGEMENTS FOR ACTUATION OF DOWNHOLE EQUIPMENT IN WELL FLUIDS

BACKGROUND OF THE DISCLOSURE

In various oil and gas operations, it is desirable or even necessary to operate tools that are located in a wellbore drilled from the surface that penetrates a hydrocarbon bearing formation. Such operations can include opening or closing valves, activating or deactivating tools, and the like. Historically, a variety of techniques have been developed to perform such operations. One example is pressure actuation, in which the pressure in the wellbore can be manipulated by pumps at the surface to induce a desired action. In another variation, plugs, balls, darts, and the like can be dropped into a wellbore or a tubular disposed therein, eventually seating on a mechanism that performs the desired operation. With the development of ever more sophisticated tools and wellbore environments, other actuation techniques have been developed, including the use of Radio Frequency Identification Transponders, also known as RFID tags.

One example of a downhole tool arrangement actuated by an RFID tag is disclosed in applicant's co-pending published U.S. patent application bearing publication number 2014/0305662, which is hereby incorporated by reference in its entirety. In general, this and other RFID embodiments operate by designing a downhole RFID receiver into the tool. This RFID reader will respond to an RFID tag encoded with the appropriate data payload to actuate the tool. When it is desired to actuate the tool, one or more RFID tags having the appropriate data payload can be introduced into the wellbore and, upon arrival at the RFID reader of the tool, will cause actuation of the tool. In some embodiments, the RFID reader and downhole tool can be configured for further actuation or reversal of actuation when an RFID tag encoded with a different corresponding data payload is detected. In such cases, when it is desired to further actuate or reverse the actuation of the tool, and RFID tag can be introduced into the wellbore or a tubular thereof.

RFID tags come in two broad categories. Active RFID tags have their own power source, typically a battery, and are typically configured to continuously transmit their data payload. When they come within range of an Active RFID detector, which can be configured as a "listen only" device, the Active RFID detector will detect the transmitted signal and respond according to its program. Passive RFID tags do not have their own power source, and are powered by a passive RFID tag reader. Generally, a passive RFID tag reader emits a relatively high frequency electromagnetic field (VHF band). This field stimulates a coil in the passive RFID tag that then charges a capacitor within the passive tag that serves as the passive tag's power source. Once the capacitor is charged, the passive tag begins transmitting its payload (typically in the LF band) until the charge in the capacitor is depleted. This transmitted signal is detected by the passive RFID tag reader.

In some embodiments it may be desirable to use an active tag versus a passive tag. The reasons for this can vary. One distinction between commercially available active and passive tags is operating frequency. Heretofore, passive tags used in downhole tool operation have typically operated in the LF range, while most commercially available active tags operate in the UHF range. Also, many passive tags operate using FM (frequency modulated) or FSK (frequency shift keying) while many commercially active tags operate using AM (amplitude modulated) or ASK (amplitude shift keying) for encoding data. Also, many active tags and/or active tag readers are not designed to accommodate the high operating temperatures, pressures, and vibration levels associated with downhole operation. Finally, there is an existing base of downhole tools that are designed around various existing passive reader technologies, and adapting these to conventional active tags would require significant redesign of antennas, transceivers, and the like. Thus, what is needed is a mechanism to adapt preexisting passive RFID tags for active mode operation or to otherwise simulate the operation of such preexisting RFID tags with an active RFID tag design.

SUMMARY OF THE DISCLOSURE

Disclosed herein is a first RFID tag arrangement for actuating a downhole tool located in a wellbore. The first RFID tag arrangement can include a non-metallic housing having disposed therein a passive RFID tag, electrical power source, pulsed oscillator circuit and energizer coil. The electrical power source can power the pulsed oscillator circuit to drive the energizer coil to stimulate and thereby activate the passive RFID tag such that the tag may be read by an RFID tag reader external to the RFID tag arrangement. The first RFID tag arrangement can be adapted to include a passive RFID tag that is programmable, and/or so that the electrical power source can be a battery, capacitor, or other power source.

Also disclosed herein is a second RFID tag arrangement for actuating a downhole tool located in a wellbore. The second RFID tag arrangement can include a non-metallic housing having disposed therein an electrical power source, a transmission circuit, and a transmitter coil. The electrical power source can configure the transmission circuit to drive the transmitter coil to transmit a payload stored in the transmission circuit via the coil such that the tag arrangement may be read by an RFID tag reader external to the RFID tag arrangement. The second RFID tag arrangement can be adapted so that the transmission circuit is programmable, and/or so that the electrical power source can be a battery, capacitor, or other power source.

Also disclosed herein is a method of actuating a downhole tool designed to be used with a passive RFID tag using an active RFID tag instead. The method can include placing an RFID tag reader of the downhole tool in a listen only mode in which the RFID tag reader does not transmit a stimulation signal to a tag. The method can further include introducing into the wellbore an active RFID tag that transmits its payload to the RFID tag reader without stimulation by the RFID tag reader. The method can still further include configuring the RFID tag reader to transmit a signal to the active RFID tag reconfiguring the tag when it receives the payload from the active RFID tag. The active RFID tag can be either the first or second RFID tag arrangements discussed above, or can be another active RFID tag design.

The foregoing summary is not intended to summarize each potential embodiment or every aspect of the present disclosure.

BRIEF DESCRIPTION OF THE DRAWINGS

FIGS. 4A-4F illustrate embodiments of tag delivery systems for the disclosed energizer RFID tag and custom active RFID tag of the present disclosure.

DETAILED DESCRIPTION

Figure 1:
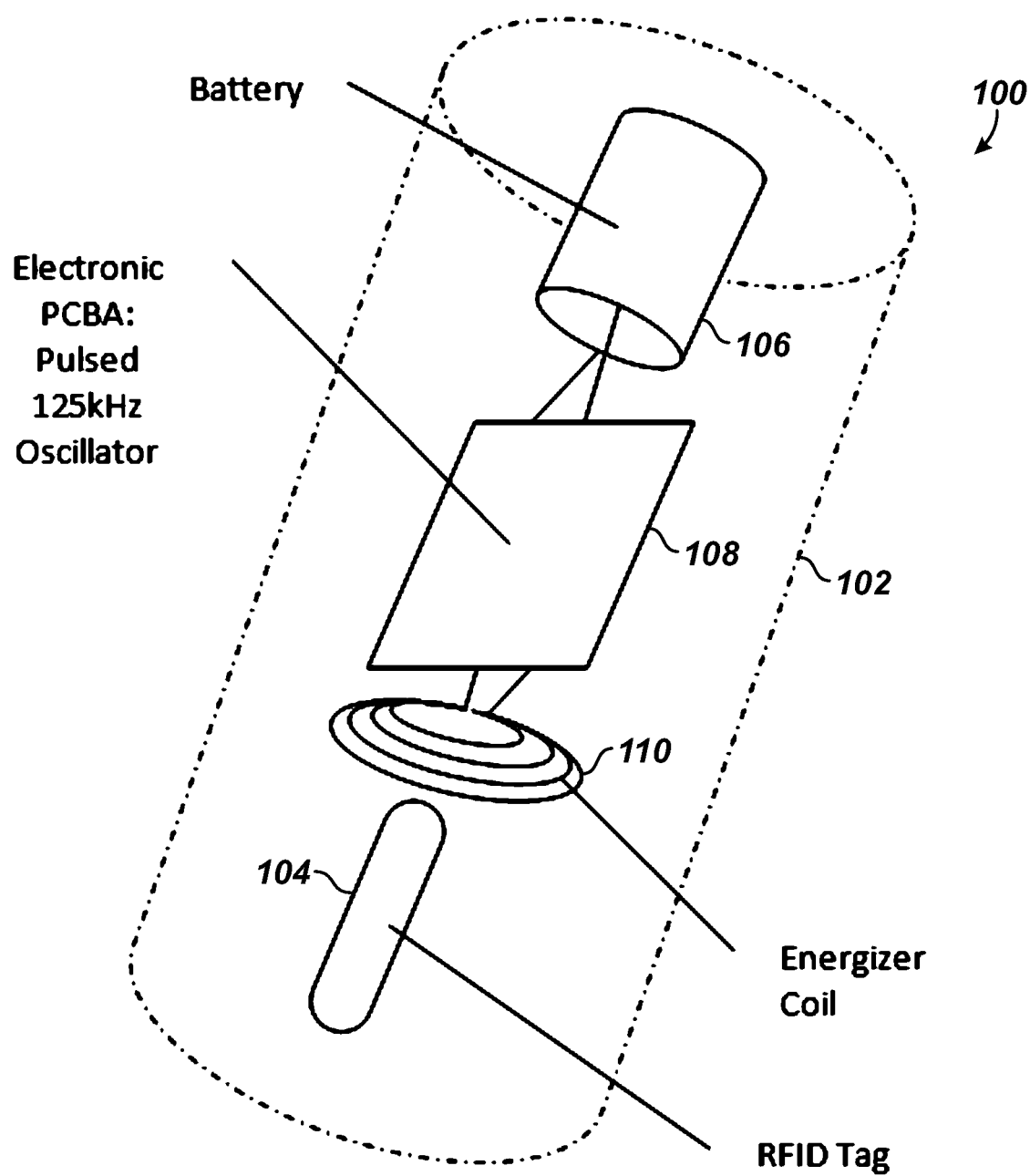
FIG. 1 illustrates an embodiment of an energizer RFID tag for use with a passive RFID tag reader.

Illustrated in FIG. 1 is an Energizer RFID tag 100 created by adapting a passive RFID tag. The Energizer RFID tag 100 includes a non-metallic housing 102. For use in downhole operations, this non-metallic housing 102 can be designed to accommodate the desired range of downhole operating temperatures, pressures, and vibration levels, and can also be designed to be "intrinsically safe" for operation in explosive and/or combustible environments. Other design considerations with respect to housing 102 is that it be made of a material that is easily drillable and/or otherwise retrievable from the wellbore so that it does not interfere with any subsequent operations required in the wellbore.

Disposed within housing 102 is a conventional passive RFID tag 104. This can be any of a variety of commercially available tags, such as the Texas Instruments RI-TRP-WR3P, which is a read/write capability a/k/a programmable tag. Also disposed within housing 102 is a battery 106, a printed circuit board 108 containing a pulsed oscillator circuit, and an energizer coil 110. The pulsed oscillator circuit, powered by the battery, sends a charge cycle via the energizer coil 110 to the passive RFID tag. In one embodiment, the charge cycle can have a duration of 16-ms. The RFID tag 104 charged by the energizer coil 110 can then broadcast its pre-programmed payload. In some embodiments, the payload can be 12 bytes programmed by the user. In some embodiments, this transmit phase can have a duration of 14-ms. After the transmit phase, the circuit then returns to charge cycle and the pattern repeats.

If the passive RFID tag is located proximate an antenna, the transmitted payload will be received by the tool and acted upon according to the tool's programming. In some embodiments, the reader's antenna is arranged such that it will surround the tag as it propagates downhole, and thus the tag will typically be read when the tag is located within an external antenna surrounding the tag. Importantly in these embodiments, the external antenna and RFID receiver can be operated in "listen mode." In such a mode, the reader does not emit an electromagnetic signal that influences the energizer tag or the passive tag within. This mode of operation can be advantageously employed to increase the battery life of the tool, since the RFID reader needs to operate only in a listen mode, thus it need not send the charging pulse to the tag. Additionally, the potential for interference with reading the tag due to the charge pulse is reduced when operated in the listen only mode. Alternatively, the antenna on the tool can be configured to either transmit/receive for conventional passive tags. In either case, a further advantage of the energizer tag arrangement described above is the ability to adapt it to existing passive RFID tags.

Figure 2:
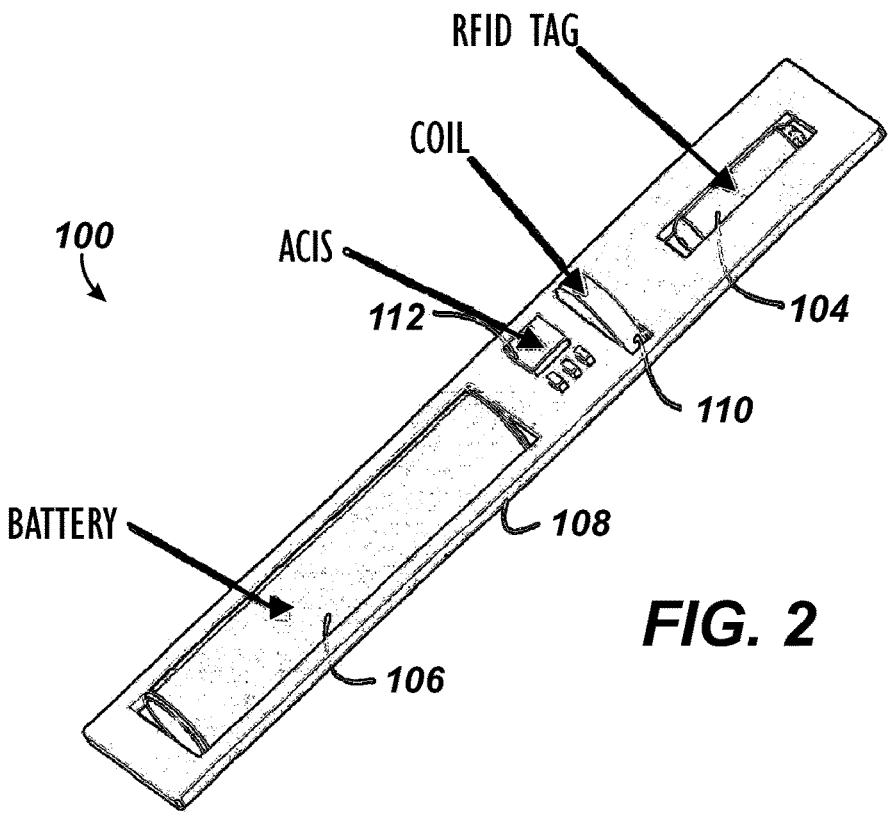
FIG. 2 illustrates an alternative embodiment of an energizer RFID tag for use with a passive RFID tag reader.

An alternative embodiment of the energizer tag arrangement is illustrated in FIG. 2, in which like reference numerals to FIG. 1 have been used. In FIG. 2, the illustration of housing 102 has been omitted. Otherwise, it can be seen that Energizer RFID tag 100 includes a passive RFID tag 104 as described above. Energizer tag also contains battery 108, and energizer coil 110, and an ASIC 112 that includes the described oscillator circuit. Each of these components is mounted on or within a printed circuit board 108. The interconnection and operation of these components is as described above with respect to FIG. 1.

In some embodiments, it might be desirable to configure a downhole tool having a conventional passive RFID tag reader to operate in a "sleep mode" corresponding to the listen only mode described above. The tool could be further configured to "wake up" in response to the detection of an energizer tag as described above. In the awakened mode, the downhole tool could operate as a conventional passive tag reader, such that it would begin stimulating passive tags (if present) and would respond to arrival of such passive tags as programmed.

As an alternative to the energizer tag arrangement described above, it is also possible to create a custom active RFID tag by directly coupling a battery to an already existing passive RFID electrical circuit. An electrical circuit as described above with the energizer coil arrangements could also be installed to be used as a timing coil.

Figure 3:
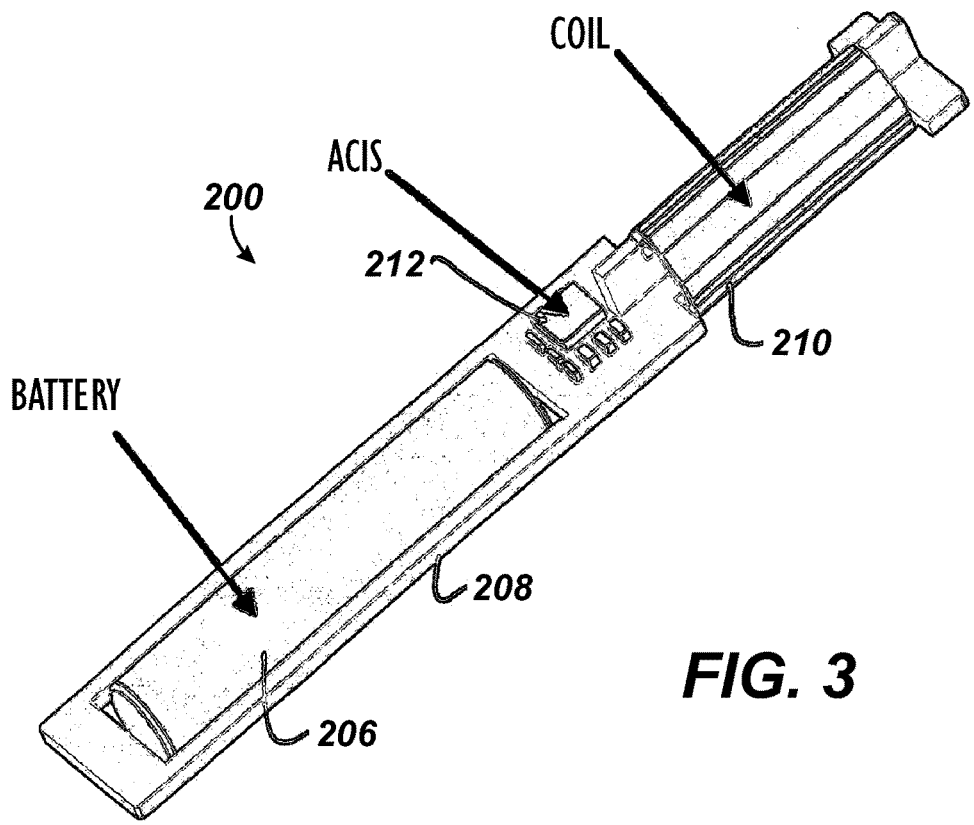
FIG. 3 illustrates an embodiment of a custom active RFID tag for use with a passive RFID tag reader.

In still other embodiments, an exemplary custom active tag 200 is illustrated in FIG. 3. The custom active tag 200 can include a printed circuit board 208, which can serve as a mounting point for the remaining components. Custom active tag 200 can also include a battery 206, which can be, for example, a Lithium Thionyl Chloride Primary Cell. In some embodiments it might be desirable to make such a battery from commercially available AA or AAA cells. In some embodiments, a 3.6V battery may be desired, necessitating the use of three such AA or AAA cells. As in the embodiments discussed above, an ASIC 212 and a custom wound coil 210 may also be provided. As in the energizer tag arrangement, such parts would be enclosed within a suitable non-metallic housing allowing for waterproofing, pressure, temperature, and vibration resistance, etc. for components within. Additionally, as noted, it may be desirable for the housing to be easily drillable and/or otherwise removable from the wellbore so as to reduce or eliminate interference with subsequent wellbore operations.

In a departure from the energizer tag arrangement described with respect to FIGS. 1 and 2, in the custom active tag arrangement of FIG. 3, the ASIC 212 powered by the battery 206, sends a transmit cycle of a payload held on the ASIC 212 via the coil 210. It can then rest for some period of time (to conserve battery), and re-start the transmit cycle and so on. In some embodiments, it might be desired to configure the payload, transmit, and rest cycles so that they correspond to those of a preexisting passive tag design. In one embodiment, the payload can be 12 bytes and can optionally be hard coded onto the ASIC 212. Alternatively, the ASIC 212 can be programmable in much the same way as the programmable tags described above. Additionally, the transmit and rest cycles can be configured to be 14-ms and 16-ms, respectively, to correspond to those used with a particular passive tag and the energizer tag arrangement described above. It will be appreciated by those skilled in the art that any operational parameters desired may be employed and programmed on the ASIC 212 for operation with any of a variety of existing or custom designed tools.

There are a variety of advantages achievable as a result of the custom active tag arrangement described above with respect to FIG. 3. For example, the custom active tag 200 can have lower power requirements, extending the battery life of the tag 200 as compared to the energizer tag arrangement. Additionally, such a custom active tag arrangement provides the same benefit of extended battery life in the downhole tool because the downhole tool can be, but need not be, operated in a listen only mode. Additionally, as with the energizer tag, there may be reduced interference with reading of the tag 200 because of the absence of the charge pulse in a conventional passive tag arrangement. Finally, because the custom active tag 200 described with respect to FIG. 3 is based on all custom componentry, it can be designed to have higher temperature and other ratings than the passive tag it is designed to emulate. As an example, battery 206 can be replaced with a capacitor for higher temperature operation, and the semiconductor components such as ASIC 212 can be designed for high temperature operation using known semiconductor technologies and design techniques.

With either of the foregoing tag designs, i.e., the energizer tag arrangement in FIGS. 1 and 2 or the custom active tag arrangement in FIG. 3, multiple transmission antennas could be installed within the housing at multiple angles such that their effective transmission field could be effectively increased to cover a higher allowable angle of the tag with respect to the reading antenna.

Also with either of the foregoing designs, a downhole tool for use with the tags 100, 200 could be configured so that when the tool receives a signal from the tag 100, 200, the tool then transmits a signal to the RFID tag 100, 200 re-programming the payload of the tag 100, 200. The RFID tag 100, 200 could then be displaced further into the well and the new payload could be used to actuate a further tool located down the well.

Figure 4C:
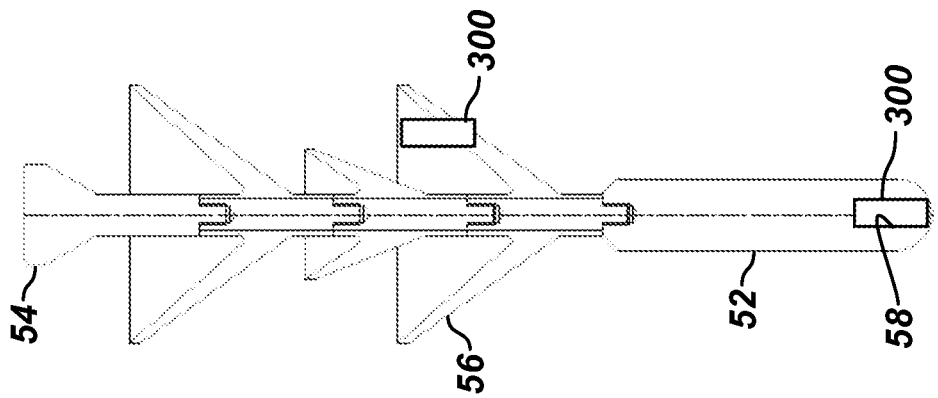
Figure 4B:
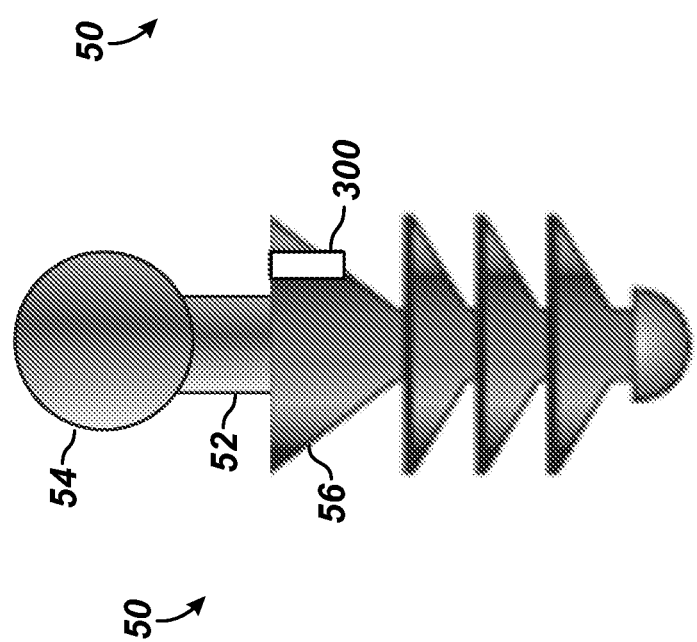
Figure 4A:
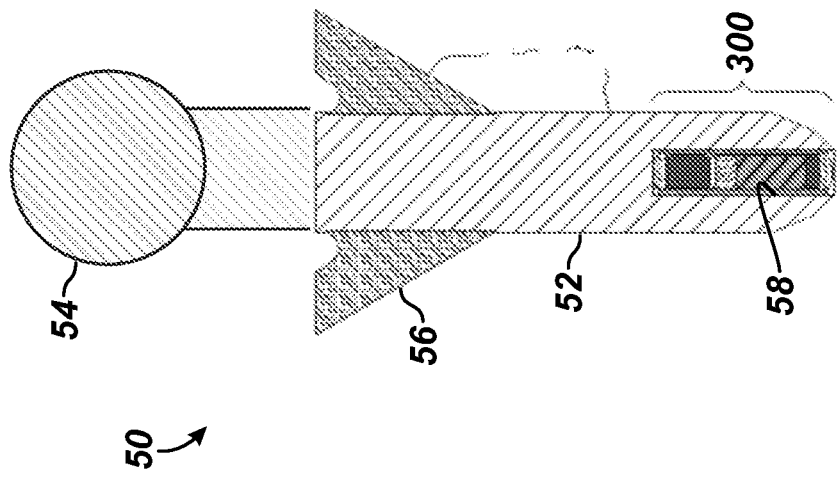

It will be appreciated by those skilled in the art that the tag arrangements described herein can be used with any of a variety of downhole RFID actuated tools and RFID tag delivery systems, including by way of example but not limitation, any of the operations described in applicant's co-pending U.S. application Ser. No. 15/153,421, filed 12 May 2016, and entitled "RFID Tag Delivery System," which is hereby incorporated by reference in its entirety. In particular, FIGS. 4A-4C illustrate a tag carrier 50 and an RFID tag 300 of a tag delivery system according to the present disclosure. The RFID tag 300 can be an Energizer RFID tag 100 according to the energizer tag arrangement in FIGS. 1 and 2 or can be a custom active RFID tag 200 according to the custom active tag arrangement in FIG. 3.

Here, the tag carrier 50 can be a dart. As shown in FIGS. 4A-4C, the dart 50 includes a mandrel 52 (composed of a relatively stiff and non-conductive material, such as an engineering polymer or fiber reinforced composite) and includes a finned seal 56 (composed of a relatively flexible material such as an elastomer or elastomeric copolymer). As shown in FIGS. 4A-4C, the dart 50 may have a catch element 54, such as a ball stud or the like.

As shown in FIG. 4A, the mandrel 52 may have a nose formed at a leading end thereof. A receptacle 58 formed in the nose can hold the RFID tag 300, and a cap may retain the RFID tag 300 in the receptacle 58. The RFID tag 300 would thereby be centralized in a bore of a surrounding tubular, allowing confidence in using only one RFID tag 300 to communicate with a control sub.

As shown in FIG. 4B, an RFID tag 300 may be located in or on a fin 56. The RFID tag 300 would thereby be located close to an inner surface of a surrounding tubular, potentially closer to an antenna (not shown) than when centralized. Closer proximity of the RFID tag 300 to the antenna may provide better transmission of command signals. When located on a fin 56, it may be desirable to affix the RFID tag 300 to the "back" of the fin 56—the surface nearest the mandrel 52—so that the fin 56 shelters the RFID tag 300 during downhole travel.

Further, more than one RFID tag 300 can be used on a dart 50, such as shown in FIG. 4C. Here, the dart 50 includes an RFID tag 300 centrally located in the nose receptacle 58 and includes another RFID tag 300 located in the finned seal 56. These and other variations can be used.

FIG. 4D illustrates another tag delivery system of the present disclosure. The system includes a tag carrier 50 and an RFID tag 300. The tag carrier 50 may be a pump down plug, such as a dart. Again, the dart 50 may include a finned portion 56, a mandrel portion 52, and a catch element, such as a tail portion 58. The finned portion 56 may include one or more (three shown) fins extending outward from an outer surface of the mandrel portion 52. The dart 50 may include a material having sufficient flexibility, such as a foamed polymer like polyurethane. A receptacle may be formed in the tail portion 58 of the dart 50, and the RFID tag 300 may be disposed in the receptacle. As shown, the receptacle for the RFID tag 300 may be centrally located within the dart 50. The RFID tag 300 may be retained in the receptacle, for example, by bonding or interference fit.

A tag launcher (not shown) at surface or elsewhere launches the dart 50, and the dart 50 can be propelled by pumped fluid. The dart 50 travels into a control sub 80 and passes an antenna 84. If desired, the dart 50 can travel until engaging a seat 82, which may be composed of a relatively stiff and nonconductive material, such as an engineering polymer or fiber reinforced composite.

As the RFID tag 300 comes in proximity to the antenna 84 by either passing through the control sub 80 or at least temporarily engaging the seat 82, the RFID tag 300 communicates signals with the antenna 84 of the control sub 80. At that point, some form of operation can be performed. As one brief example, a control circuit 86 of the sub 80 may operate an actuator (not shown) to shift a valve sleeve (not shown) to an open or closed position. As will be appreciated, any suitable form of operation, actuation, and the like can be performed in response to the control signals provided by the RFID tag 300. Eventually, increase pressure pumped against the dart 50 may pass the dart through the throat of the seat 82.

FIG. 4E illustrates an alternative tag carrier 60 for use with a tag delivery system. Instead of the tag carrier 60 being a dart, the tag carrier 60 is another type of pump down plug, such as a pig having a body with a shape that is elongated or ellipsoid (i.e., a prolate) or shaped like an egg, a capsule, or a bullet. The pig 60 may be composed of a material having sufficient flexibility, such as a foamed polymer of polyurethane or the like. A receptacle 64 may be formed in a tail portion 62 of the pig 60, and the RFID tag 300 may be disposed in the receptacle 64. The receptacle 64 may be centrally located within the pig 60, and the RFID tag 300 may be retained in the receptacle by bonding or interference fit.

Given its shape, the pig 60 may or may not sealingly engage a bore of a tubular string as the pig 60 is pumped therethrough. Due to the curved outer surface of the pig 60, the pig 60 may not be completely stopped upon engagement with a shoulder, stop, lip, or seat (e.g., 82) of a control sub; however, the pig 60 may be sufficiently slowed to ensure communication between the RFID tag 300 and an antenna (not shown).

As another example, FIG. 4F illustrates another tag delivery system of the present disclosure. The system includes a tag carrier 50 and an RFID tag 300 (e.g., Energizer RFID tag 100 or custom active RFID tag 200). The tag carrier 50 may be a pump down plug, such as a dart. Again, the dart 50 may include a finned portion 56, a mandrel portion 52, and a catch element, such as a tail portion 58. A receptacle may be formed in the nose of the dart 50, and the RFID tag 300 is disposed in the receptacle.

A tag launcher (not shown) at surface or elsewhere launches the dart 50, and the dart 50 can be propelled by pumped fluid. The dart 50 travels into a control sub 80 and passes an antenna 84. If desired, the dart 50 can travel until engaging a seat 82. As the RFID tag 300 comes in proximity to the antenna 84 by either passing through the control sub 80 or at least temporarily engaging the seat 82, the RFID tag 300 communicates signals with the antenna 84 of the control sub 80. At that point, some form of operation can be performed.

As these details of tag delivery systems show, the RFID tags 100, 200, and 300 of the present disclosure can be incorporated into a number of tag carriers in different ways. Moreover, the tag carrier can be launched with an appropriate launcher at surface or elsewhere and can engage various stops, seats, etc. and pass various forms of antennas in subs downhole to achieve some form of operation.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A Radio Frequency Identification (RFID) tag arrangement readable by an RFID tag reader for actuating a downhole tool located in a wellbore, the RFID tag arrangement comprising:
    a non-metallic housing having disposed therein a passive RFID tag, an electrical power source, a pulsed oscillator circuit, and an energizer coil,
    wherein the electrical power source powers the pulsed oscillator circuit to drive the energizer coil to stimulate and thereby activate the passive RFID tag such that the tag may be read by the RFID tag reader external to the RFID tag arrangement.

2. The arrangement of claim 1, wherein the passive RFID tag is programmable.

3. The arrangement of claim 1, wherein energizer coil stimulates the RFID tag with a 125-kHz signal for a duration of 16-ms, and wherein the RFID tag transmits its payload for a period of 14-ms thereafter.

4. The arrangement of claim 1, wherein the payload of the RFID tag is 12 bytes.

5. The arrangement of claim 1, wherein the electrical power source is a battery.

6. The arrangement of claim 1, wherein the electrical power source is a capacitor.

7. A method of actuating a downhole tool designed to be used with a passive Radio Frequency Identification (RFID) tag using an active RFID tag, the method comprising:
    placing an RFID tag reader of the downhole tool in a listen only mode in which the RFID tag reader does not transmit a stimulation signal to a tag; and
    introducing into the wellbore an active RFID tag that transmits its payload to the RFID tag reader without stimulation by the RFID tag reader,
    wherein the active RFID tag is an RFID tag arrangement comprising: a non-metallic housing having disposed therein a passive RFID tag, electrical power source, pulsed oscillator circuit and energizer coil,
    wherein the electrical power source powers the pulsed oscillator circuit to drive the energizer coil to stimulate and thereby activate the passive RFID tag.

8. The method of claim 7, further comprising configuring the RFID tag reader to transmit a signal to the active RFID tag reprogramming the tag when it receives the payload from the active RFID tag.

9. The method of claim 7, comprising stimulating the RFID tag with a 125-kHz signal of the driven energizer coil for a duration of 16-ms; and transmitting the payload of the stimulated passive RFID tag for a period of 14-ms thereafter.

10. The method of claim 7, comprising powering the pulsed oscillator circuit to drive the energizer coil with a battery or a capacitor for the energy source.

11. An assembly for use downhole in a wellbore, the assembly comprising:
    a non-metallic housing;
    an electrical power source disposed in the non-metallic housing;
    a pulsed oscillator circuit disposed in the non-metallic housing and powered by the electrical power source;
    an energizer coil disposed in the non-metallic housing and being driven by the pulsed oscillator circuit; and
    a passive Radio Frequency Identification (RFID) tag disposed in the non-metallic housing and being encoded with a payload, the passive RFID tag being stimulated by the driven energizer coil and transmitting the payload in response thereto.

12. The assembly of claim 11, wherein the passive RFID tag is programmable.

13. The assembly of claim 11, wherein energizer coil stimulates the passive RFID tag with a 125-kHz signal for a duration of 16-ms, and wherein the stimulated passive RFID tag transmits the payload for a period of 14-ms thereafter.

14. The assembly of claim 11, wherein the payload of the RFID tag is 12 bytes.

15. The assembly of claim 11, wherein the electrical power source is a battery or a capacitor.

16. The assembly of claim 11, further comprising a downhole tool having an RFID tag reader for reading the transmitted payload, the RFID tag reader placed in a listen only mode in which the RFID tag reader does not transmit a stimulation signal.

17. The method of claim 16, further comprising configuring the RFID tag reader to transmit a programming signal to the passive RFID tag reprogramming the passive RFID tag when the RFID tag reader receives the payload from the passive RFID tag.

18. The assembly of claim 16, further comprising a carrier deployable downhole in the wellbore to the downhole tool and having the non-metallic housing with the passive RFID tag, the electrical power source, the pulsed oscillator circuit, and the energizer coil disposed therein.

* * * * *